INVENTOR
George D. Mylchreest

United States Patent Office 3,050,771
Patented Aug. 28, 1962

3,050,771
SYSTEM FOR FEEDING MEAT IN WATER EMULSION INTO MOLDS
George D. Mylchreest, Hartford, Conn., assignor to Emhart Manufacturing Company, Hartford, Conn., a corporation of Delaware
Filed June 16, 1960, Ser. No. 36,625
9 Claims. (Cl. 17—41)

This invention relates to a system for feeding plastic-like materials under superatmospheric pressure to molds for treatment in and removal from the molds.

More specifically, the invention relates to a system for feeding plastic-like materials under superatmospheric pressure at a fixed feeding station into molds moved successively into feeding position at the feeding station.

In its more detailed aspects the invention relates to a system for feeding plastic-like materials under superatmospheric pressure into successive molds carried by a rotating turret which is advanced in a step-by-step movement to successively position each mold carried by the turret at the feeding station.

The feeding of plastic-like materials, such for example as meat in water emulsions, under superatmospheric pressure into molds has presented serious problems, particularly where a plurality of molds are successively moved into and away from a fixed feeding station. The avoidance of leakage of plastic-like material from the feeding station during the interval of movement of one mold away from the fixed feeding station and the next successive mold into position at the feeding station, while at the same time insuring an adequate supply of plastic-like material to quickly charge each successive mold, have been limiting factors in the successful use of machines embodying a plurality of molds which are successively advanced to and from a fixed feeding station.

It is an object of the present invention to provide a system for feeding plastic-like materials under superatmospheric pressure to molds successively brought into feeding position at a fixed feeding station which will obviate difficulties heretofore encountered in the charging of successive molds with plastic-like materials under superatmospheric pressure.

It is a more specific object of the invention to provide a system for supplying plastic-like materials, such for example, as meat in water emulsions, under superatmospheric pressure to successive molds carried by a turret driven in a step-by-step rotary movement to bring the molds carried by the turret successively into alignment with feeding means at a feeding station.

Still more specifically, it is an object of the invention to provide a supply system for feeding molds, which are moved successively to and from a feeding station, embracing an accumulator at the feeding station for accumulating plastic-like material in amount adequate to at least substantially completely charge a given mold, means for periodically supplying plastic-like material to the accumulator and means for applying pressure to the material in the accumulator to assist in charging each successive mold in combination with means to discontinue the supply of plastic-like material to the accumulator and cease the application of pressure to plastic material in the accumulator during the interval of movement of each successive mold to and from the feeding station.

Further and more detailed objects of the invention will become apparent as the description proceeds, which will be given in relation to the exemplified embodiment of the invention shown in the accompanying drawings, in which—

The system of the present invention for feeding plastic-like materials to molds is illustrated in association with a machine employed for the cooking of a meat and water emulsion in each of successive molds carried by a turret to produce skinless frankfurters. Such a machine forms the subject-matter of the co-pending application of Bernard Sassen et al., Serial No. 806,936, incorporated herein by reference as to the details of the machine.

Figure 1:
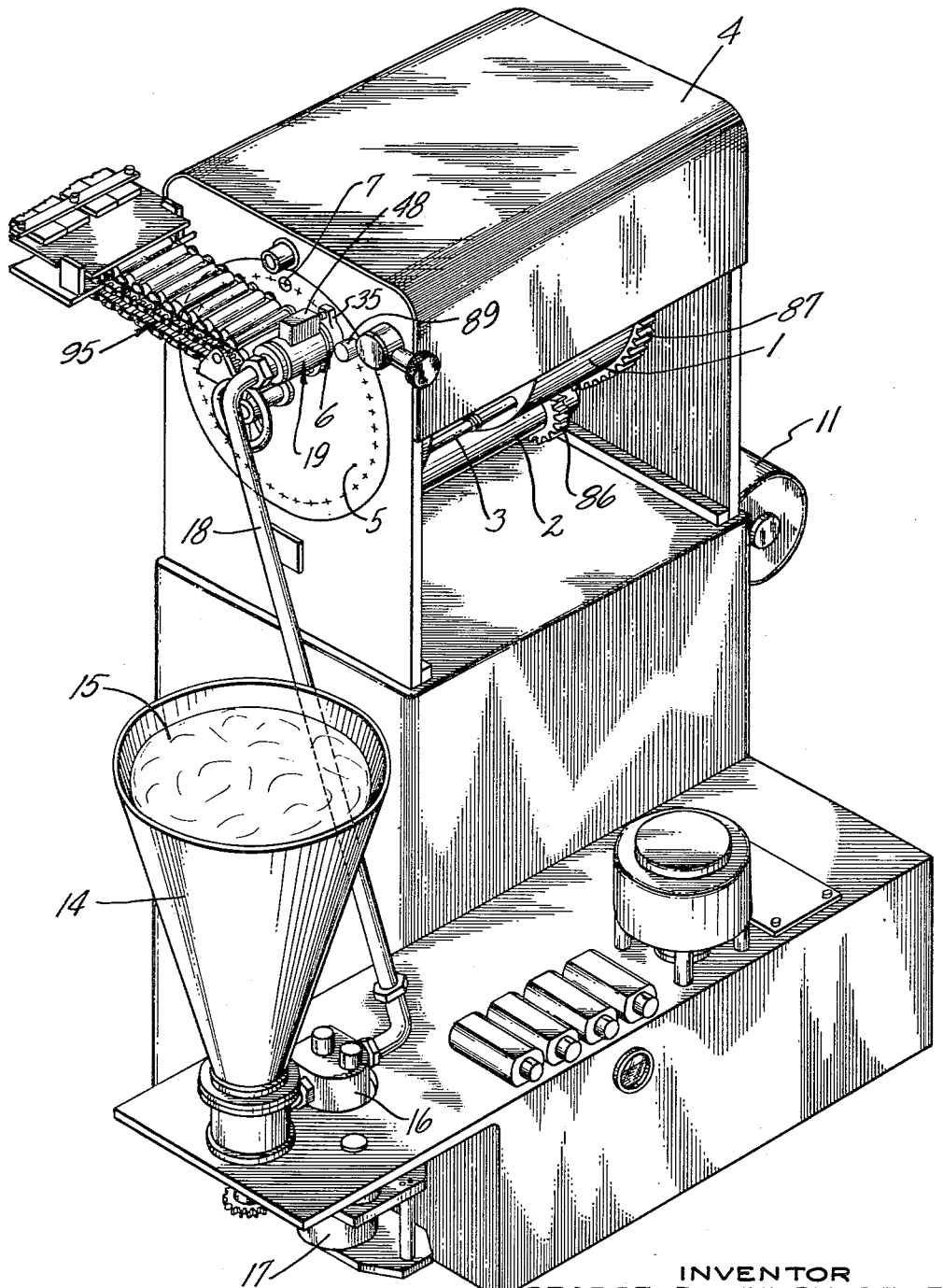
FIGURE 1 is a perspective view of a machine embodying the invention.

As shown in FIGURE 1 of the drawings, the molds to be charged are carried in a rotating turret 1 driven by an indexing drive shaft 2 controlled by suitable timed indexing means to insure a step-by-step rotation of the turret 1 which in the illustrated embodiment carries forty molds 3. The turret is illustrated as mounted in the housing 4 which carries the stationary circular plate 5 for closing the open ends of the molds 3 carried by the turret 1 during rotation of the turret from the feeding station 6 to the ejection station 7.

Figure 2:
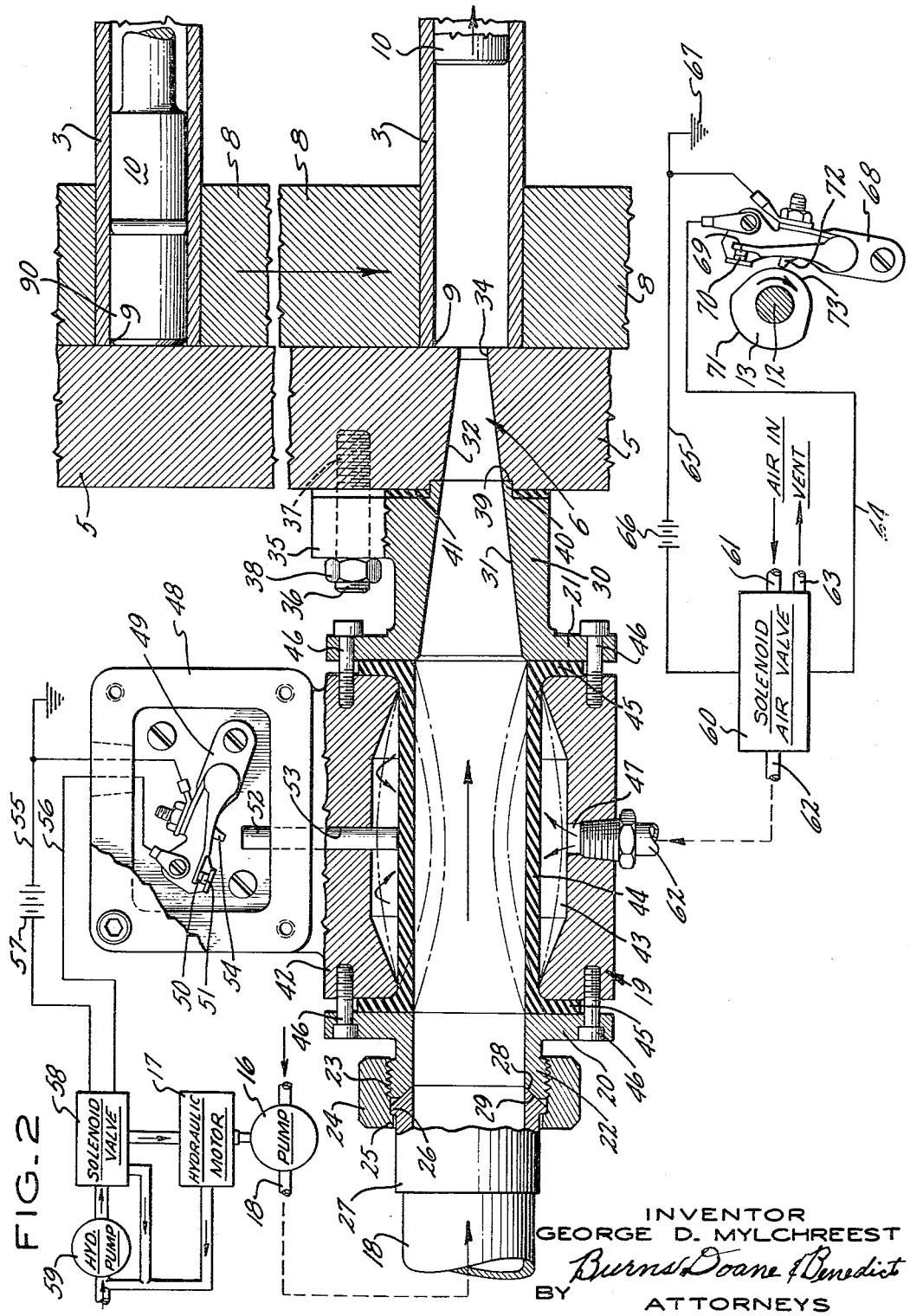
FIGURE 2 is a detail view partly in section and partly schematic illustrating the mold supply system.

The turret 1 rotates clockwise with respect to the stationary plate 5 as seen in FIGURE 1. The open ends of the molds 3 carried by the turret 1 extend through circular plate 8 of the turret as shown in FIGURE 2. The adjacent faces of stationary plate 5 and rotating plate 8 are closely fitted so that the open ends 9 of the molds 3 in the rotating plate 8 are closed by the stationary plate 5 during rotation of the turret 1. For each mold 3 a plunger 10 is carried by the turret 1 which is responsive to a system of hydraulic control at the back of the housing 4, generally shown in FIGURE 3. It is sufficient to here point out that when a mold 3 is positioned at the feeding station 6 the associated plunger 10 has its forward face initially flush with the open end 9 of the mold 3 and is moved to the right as shown in FIGURE 2 under the pressure of the plastic material charged into the mold 3. At the ejection station 7 the plunger 10 in the mold 3 at that station moves to the left as shown in FIGURE 2 to expel the treated charge from the mold 3. Indexing drive shaft 2 is driven by the motor 11 through intermediate step-by-step timing mechanism effective to rotate the turret 1 in a step-by-step manner to provide the required dwell period for each mold 3 at each of the successive stations through which the mold passes in a complete revolution of the turret 1.

The motor 11 also drives the continuously rotating cam shaft 12 carrying the cam 13, the function of which will be later described. The shaft 12 is driven in timed relation to the speed of the motor 11 through gearing and timing mechanism in such manner that shaft 12 makes one complete revolution for each indexing movement of the turret 1 as will be described with reference to FIGURE 3. For example, in the illustrated embodiment in which the turret 1 carries forty molds 3, the driving means for the shaft 12 is so timed that the shaft 12 will make forty revolutions for each revolution of the turret 1.

Coming now to the system for feeding plastic-like materials under superatmospheric pressure to the molds 3 carried by the turret 1, the invention is exemplified in reference to a machine for feeding meat in water emulsion to the successive molds 3 when they are moved into alignment with the feeding station 6. The feeding system generally embraces the hopper 14 for emulsion 15 which is fed by a hydraulically driven displacement pump 16 driven by the hydraulic motor 17 through the supply line 18 to the accumulator indicated generally at 19 from which a charge of emulsion is injected into each mold.

Referring to FIGURE 2, it will be observed that the accumulator indicated generally at 19 is clamped between the annular flanges 20 and 21. The annular flange 20 is integral with the tubular fitting 22 which has its free end threadedly engaged at 23 with the annular collar 24 having flange 25 which coacts with a flange 26 on the fitting 27 which is press-fitted over the end of the supply line 18. The arrangement is such that when the collar 24 is threaded onto the tubular fitting 22 the flange 25 of collar 24 engages flange 26 of fitting 27 to tightly engage the annular inclined faces 28 and 29 respectively carried by the fittings 22 and 27. The removable collar 24 permits ready disassembly of the supply line 18 from the fitting 22 for cleaning, repair and the like.

The annular flange 21 is carried by the member 30, the tapered inner bore 31 of which, together with the tapered bore 32 and cylindrical opening 34 formed in the stationary plate 5, constitute the injection nozzle through which plastic material is fed into each mold 3 at the feeding station 6. The member 30 has the radially extending ear 35 through which the bolt 36 extends and which is threaded into the stationary plate 5 at 37. The nut 38 is employed to clamp the member 30 in fixed position on the plate 5. It will be observed that plate 5 is slightly recessed as indicated at 39 to receive the annular projecting end 40 of member 30 and that a suitable compressible packing 41 surrounds the annular projection 40 and is clamped between the member 30 and the stationary plate 5.

The accumulator indicated generally at 19 embraces the housing 42 provided with an inner chamber 43 which is so dimensioned and contoured as to permit of limited controlled expansion of the resilient tubular member 44. The resilient tubular member 44 carries annular flanges 45 at its opposite ends, which flanges 45 are clamped between the housing 42 of accumulator 19 and the annular flanges 20 and 21 carried respectively by the fitting 22 and the member 30, a series of bolts 46 being employed to compress the annular flanges 45 of the resilient tubular member 44 between the respective flanges 20 and 21 and the housing 42.

The arrangement is such that the resilient tubular member 44 may under the influence of air pressure introduced to the chamber 43 through the air inlet 47 be collapsed to approximately the contracted dotted line position shown in FIGURE 2 to thereby force plastic material contained in the tubular member 44 of the accumulator 19 through the injection nozzle comprised of the tapered bores 31 and 32 into a mold 3.

When air pressure is cut off from the supply line 47 in a manner hereinafter described and the hydraulic pump 16 is operating to feed plastic material into the accumulator, the resilient tubular member 44 will expand outwardly in the chamber 43, being limited in such expansion by the diameter of chamber 43 and the contour of the wall thereof. The accumulator housing 42 carries an upwardly projecting switchbox 48 carrying a switch 49 adapted to have its contacts 50—51 normally biased into closed position and to have the contact 50 moved away from the contact 51 to open the switch 49 by vertical movement of the plunger 52 which moves freely through bore 53 in the housing 42. The arrangement is such that upon predetermined expansion of the resilient tubular member 44 the plunger 52 will be raised into contact with the abutment 54 and open the switch 49. The switch 49 opens and closes the circuit embracing the leads 55 and 56 through battery 57 to solenoid valve 58. When the switch 49 is closed, valve 59 is open to permit the supply of hydraulic fluid from a suitable hydraulic pump 59 to the hydraulic motor 17 to drive the displacement pump 16 for feeding plastic material from the hopper 14 through the supply line 18 to the accumulator 19.

When the resilient tubular member 44 is expanded by infed plastic material to a predetermined degree, the plunger 52 will open the switch 49 causing the solenoid valve 58 to close and bypass the hydraulic fluid from pump 59 back to the feed source for such hydraulic fluid. It will thus be apparent that during the period that the resilient tubular member 44 is expanded to the extent of maintaining the switch 49 open through the medium of the plunger 52, the feed pump 16 will be inactive and no plastic material will be fed through the supply line 18 to the accumulator.

Turning now to the control for the compressed air supply through inlet 47 at the bottom of the housing 42, the solenoid valve 60 when open allows compressed air to pass from a suitable source through line 61, valve 60, and line 62 to air inlet 47. When the solenoid valve 60 is closed it acts to shut off the supply of air through line 61 and to vent the air from chamber 43 back through line 62, valve 60, and out through vent 63.

The circuit for solenoid valve 60 embraces leads 64, 65, battery 66, ground 67, and switch 68, having contacts 69 and 70 normally biased into closed position and adapted to be separated by the movement of contact 69 away from contact 70 during the period that the high portion 71 of the cam 13 on shaft 12 is in contact with the abutment 72. When the contacts 69 and 70 of switch 68 are separated the solenoid valve 60 is closed and the air in chamber 43 surrounding the tubular elastic member 44 is vented to the atmosphere through vent 63. During the period that the abutment 72 of the switch 68 is riding over the low face 73 of the cam 13, the contacts 69 and 70 of switch 68 will be closed and the solenoid valve 60 open to supply compressed air from line 61 through line 62 and inlet 47 to the chamber 43 of the accumulator.

Figure 3:
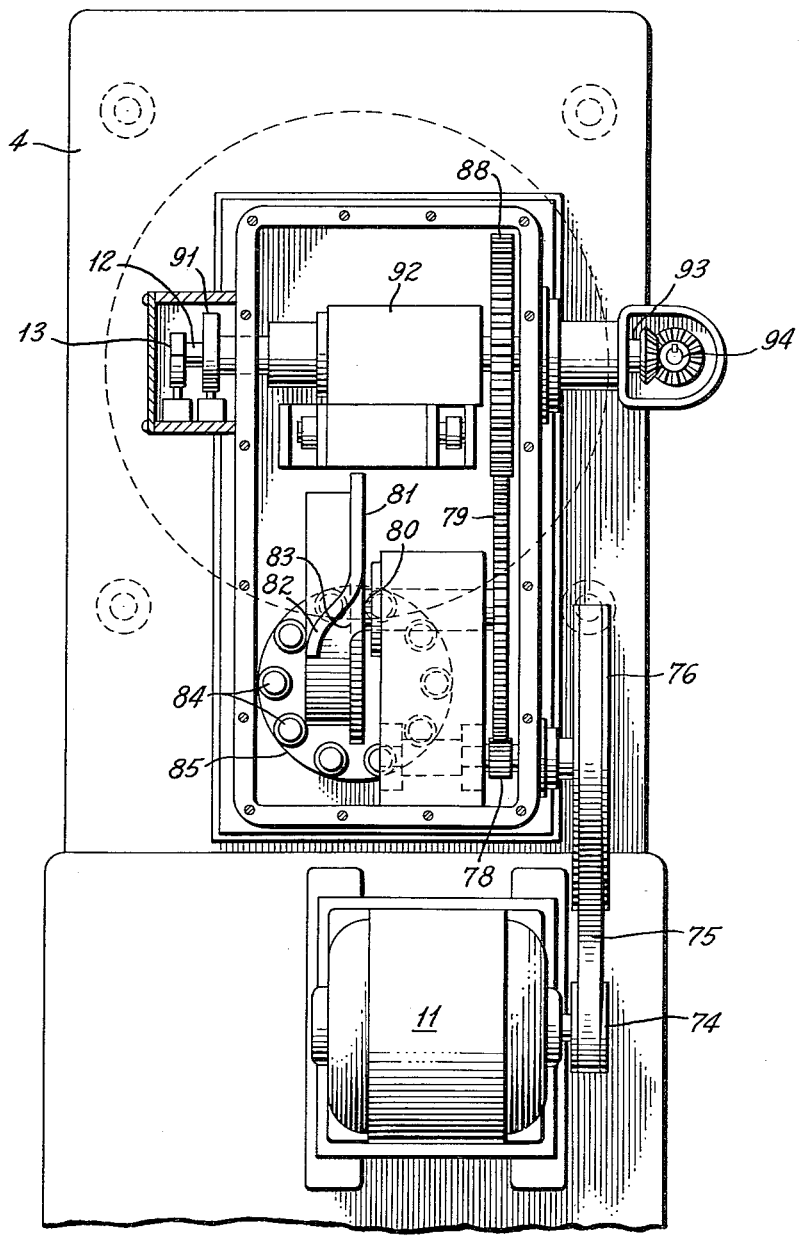
FIGURE 3 is an enlarged detail view illustrating the index driving means for step-by-step rotation of the turret and continuous rotation of the timing shaft.

Coming now to the manner of indexing the turret 1 to move the molds 3 from station to station, reference is made to FIGURE 3 wherein the motor 11 through pulley 74 and timing belt 75 drives the toothed pulley 76 in such manner that there is no slippage in this drive. Pulley 76 through gearing 78 and 79 drives the shaft 80 and the indexing wheel 81 having an indexing cam 82.

Indexing cam 92 extends radially from the perimeter of indexing wheel 81 and provides a radial flange which is continuous except for the interruption 83, where the indexing cam 82 curves from one face of wheel 81 over to the opposite face as shown in FIGURE 3. The flange portion of cam 82 passes between adjacent ones of the series of rollers 84 carried on the disc 85. The disc 85 is fixedly mounted on the rear end of the index driving shaft 2 (FIG. 1), and in the illustrated embodiment carries ten rollers 84. Shaft 2 carries pinion 86 which meshes with ring gear 87, which is carried by and rotates with the turret 1.

It will be recognized that as the indexing wheel 81 rotates in a clockwise direction as seen from the left of FIGURE 3, disc 85 carrying rollers 84 will remain stationary while the flange portion of cam 82 is passing through adjacent rollers. At this time the shaft 2 to which disc 85 is secured will hold the turret 1 in a particular position by the intermeshing of pinion 86 with ring gear 87. As indexing wheel 81 continues to rotate the curved portion of cam 82 will engage between adjacent rollers 84 causing a predetermined extent of angular rotation of disc 85 with one of the rollers 84 passing through the interruption 83 in the flange portion of indexing cam 82. This predetermined angular rotation of disc 85 is transmitted through shaft 2, pinion 86, and ring gear 87 to effect indexing of the turret 1 so that each of the molds 3 is carried to the next station. With a ratio of four to one between pinion 86 and ring gear 87, it will be observed that the cooperation between the indexing cam 82 and the ten rollers on disc 85 will result in four revolutions of shaft 2 and pinion 86 for each revolution of the turret 1 and ring gear 87, with ten interruptions or dwell periods for each rotation of the shaft 2 occasioned by the action of indexing cam 82 and rollers 84 on disc 85. Since shaft 2 and pinion 86 partake of four revolutions for each revolution of the turret 1 and ring gear 87, the turret 1 will be advanced stepwise in forty movements to thereby index each of the forty molds 3 carried by the turret 1 to each station, with a uniform dwell period of each mold 3 at each station such as the feeding station 6 and the ejection station 7. In the exemplified embodiment the turret 1 makes one revolution per minute.

The cam shaft 12 (FIGS. 2 and 3) carrying cam 13 for controlling switch 68 and solenoid air valve 60 is also driven from gear 79 through gear 88 as shown in FIGURE 3. The gear ratio for driving cam shaft 12 is such that cam 13 rotates ten times for each revolution of disc 85 and shaft 2 and thus cam 13 is rotated forty times for each revolution of the turret 1.

As hereinbefore described, the cam 13 carried by cam shaft 12 operates to open and close switch 68 to control through solenoid valve 60 the period of supply of compressed air pressure to the chamber 43 surrounding the resilient tubular member 44 of accumulator 19 and the period during which air pressure is exhausted from chamber 43.

The cam faces 71 and 73 are so positioned on the cam 13 that the solenoid valve 60 will be open to supply compressed air, preferably at a pressure of the order of 120 p.s.i., through inlet 47 to chamber 43 only during a predetermined interval of time while a mold 3 is in axial alignment with the injection nozzle at the feeding station 6. The cam 13 insures that the solenoid valve 60 will be closed and the chamber 43 vented to atmosphere prior to each indexing movement of turret 1. The arrangement is such that no air pressure is applied to the resilient tubular member 44 of the accumulator except during the dwell of a mold 3 at the feeding station 6.

The displacement pump 16 may be any suitable commercially available pump, it having been found that the sanitary positive displacement type pump model "10 BB" as produced by the Waukesha Company of Waukesha, Wisconsin, gives satisfactory results. Pump 16 supplies a quantity of emulsion equal to a single mold charge in a fraction of the indexing period of the machine. The time interval, during which pump 16 forces emulsion into resilient tubular member 44 of accumulator 19, starts when switch 49 closes on downward movement of plunger 53 in response to contraction of member 44 as emulsion is forced from it into a mold 3 by pressure in chamber 43. The rate at which emulsion moves into a mold is greater than the pump rate; thus member 44 continues to contract, even after pump 16 has started, until a given mold is filled. Pump 16 continues to operate after a given mold is filled until switch 49 is opened. It is immaterial whether pump 16 stops prior to the venting of air pressure from chamber 43, provided both of these events occur before the next movement of the turret commences. The magnitude of the charge delivered by the pump 16 is controlled by expansion of member 44 of the accumulator 19 which raises plunger 52 to open valve 49 and stop pump 16. When the pump 16 is stopped and chamber 43 is vented, no pressure whatever will be applied to the charge of plastic material in the expanded resilient tubular member 44 of the accumulator 19 until cam 13 initiates the next opening of valve 60 to admit compressed air to chamber 43. It is during this period that the turret 1 is indexed to move a fully charged mold 3 in the direction of the arrow (FIG. 2) away from the feeding station 6 and to advance the next succeeding mold 3 into feeding position. During this indexing movement of the turret 1, the rotating plate 8 passes the open end 34 of the injection nozzle at the feeding station 6; however, since there is no pressure either from pump 16 or the compressed air supply acting on the plastic material in the accumulator and feed nozzle during such passage, there is no leakage of plastic material between rotating plate 8 of the turret 1 and stationary plate 5. It will be at once apparent that any such leakage would tend to wedge rotating plate 8 of turret 1 away from stationary plate 5 and impair if not completely destroy the operation of the machine.

When each succeeding mold 3 is brought into axial alignment with the injection nozzle at the feeding station 6, the cam 13 will have arrived at a position permitting switch 68 to close and solenoid valve 60 to open, with the result that compressed air is admitted to the chamber 43 to collapse the expanded resilient tubular member 44 of accumulator 19 and inject sufficient of its contained charge into the mold 3 to fill the same.

It will be appreciated that the particular details of the treatment of the charge in the molds 3 carried by the turret are at most but incidental to the present invention. However, it may be observed that the fixed indexing station following feeding station 6 in the illustrated embodiment is a cooking station, and that the stationary plate 5 carries a fixed electrode 89 which at the cooking station cooperates with an electrode 90 carried at the end of each plunger 10. The cooking temperature is applied to the meat and water emulsion at the cooking station by passing an electric current directly through the emulsion. Between the ejection station 7 and the feeding station 6, certain of the intermediate stations are employed to wash the mold from which the charge has been ejected and to advance the associated plungers 10 so that when the mold 3 and its associated plunger 10 arrive at the feeding station 6 the electrode carrying end of the plunger 10 will be flush with the open end 9 of the mold 3.

In the position of the parts as shown in FIGURE 2, the mold 3 is in process of being charged. The tubular member 44 is shown as partially collapsed from its expanded position and the plunger 10 moving in the direction of the arrow at a point approximately midway of the length of the mold 3.

Again referring to FIGURE 3 the shaft 12 also carries the cooking cycle initiating switch mechanism 91 and suitably timed valve controls in casing 92 for imposing hydraulic pressure on the plungers 10 of appropriate magnitude at the several stations through which the turret 1 is indexed. It is through this mechanism that the plungers 10 are advanced at the ejection station 7 to expel the treated charges from the molds 3 and to actuate the plungers 10 at the washing station to admit and eject washing fluid.

Also driven from the gear 88 is a power takeoff 93 for driving shaft 94 through suitable bevel gears. Shaft 94 in turn drives the conveyor 95, partially shown in FIGURE 1, for receiving and transporting the products such as cooked frankfurters ejected from the molds 3 at station 7, for further treatment or packaging.

Having thus described my invention, what I claim is:

1. In a machine embodying a circular mold-carrying turret, a plurality of molds near the circumference of said turret, indexing driving means for rotating the turret in step-by-step fashion through successive stations including a mold charging station and a product ejection station, the improvement comprising an ejection nozzle for feeding material to each mold when at the charging station, a feed pump, a supply line connecting said pump and said nozzle, an accumulator disposed in said supply line between said pump and said nozzle, means responsive to accumulation of material in said accumulator to stop said pump, means for applying pressure to material in said accumulator when each mold is at the filling station, and means to stop the application of pressure to material in said accumulator prior to indexing of said turret.

2. In a machine embodying a circular mold-carrying turret, a plurality of molds near the circumference of said turret, indexing driving means for rotating the turret in step-by-step fashion through successive stations including a mold charging station and a product ejection station, the improvement comprising an injection nozzle for feeding material to each mold when at the charging station, a feed pump, a supply line connecting said pump and said nozzle, an expansible accumulator disposed in said supply line between said pump and said nozzle, means responsive to expansion of said accumulator to stop said pump, means for applying fluid pressure to said accumulator when each mold is at the filling station, and means to cut off the supply of fluid pressure to said accumulator prior to indexing of said turret.

3. In a machine embodying a circular mold-carrying turret, a plurality of molds near the circumference of said turret, indexing driving means for rotating the turret in step-by-step fashion through successive stations including a mold charging station and a product ejection station, the improvement comprising an injection nozzle for feeding material to each mold when at the charging station, a feed pump, a supply line connecting said pump and said nozzle, an expansible tubular accumulator disposed in said supply line between said pump and said nozzle, means responsive to expansion of said accumulator to stop said pump, means for applying fluid pressure around the exterior of said accumulator when each mold is at the filling station, and means to stop the application of fluid pressure to said accumulator prior to indexing of said turret.

4. A machine embodying a circular mold-carrying turret, a plurality of molds near the circumference of said turret, indexing driving means for rotating the turret in step-by-step fashion through successive stations including a mold filling station and an ejection station, the improvement comprising an injection nozzle for filling each mold at the filling station, a feed pump, a supply line connecting said pump and said nozzle, an expansible tubular accumulator disposed in said supply line between said pump and said nozzle, means responsive to expansion of said accumulator to stop said pump, and means for applying air pressure to the exterior of said accumulator during a limited predetermined time when each mold is at the filling station.

5. A machine embodying a circular mold-carrying turret, a plurality of molds near the circumference of said turret, indexing driving means for rotating the turret in step-by-step fashion through successive stations including a mold filling station and an ejection station, the improvement comprising an injection nozzle for filling each mold at the filling station, an hydraulic feed pump, a supply line connecting said pump and said nozzle, an expansible tubular accumulator disposed in said supply line between said pump and said nozzle, valve means responsive to expansion of said accumulator to stop said pump, means for applying air pressure to the exterior of said accumulator during a limited predetermined time when each mold is at the filling station, and means to vent said air pressure prior to indexing the turret.

6. A machine for forming and cooking meat in water emulsions embodying a circular mold-carrying turret, a plurality of molds near the circumference of the turret, indexing driving means for rotating the turret in step-by-step fashion through successive stations including a mold stuffing station, a cooking station, a product ejection station, and a washing station, the improvement comprising an injection nozzle for feeding emulsion to each mold at the stuffing station, a feed pump, a supply line connecting said pump and said nozzle, an expansible tubular accumulator disposed in said supply line between said pump and said nozzle, means responsive to expansion of said accumulator to stop said pump, and means for applying air pressure to the exterior of said accumulator during a limited predetermined time when each mold is at the stuffing station.

7. A machine for forming and cooking meat in water emulsions embodying a circular mold-carrying turret, a plurality of molds near the circumference of the turret, indexing driving means for rotating the turret in step-by-step fashion through successive stations including a mold stuffing station, a cooking station, a product ejection station, and a washing station, the improvement comprising an injection nozzle for feeding emulsion to each mold at the stuffing station, an hydraulic feed pump, a supply line connecting said pump and said nozzle, an expansible tubular accumulator disposed in said supply line between said pump and said nozzle, valve means responsive alternately to contraction and to expansion of said accumulator to respectively start and stop said pump, means for applying air pressure to the exterior of said accumulator during a limited predetermined time when each mold is at the stuffing station, and means to vent said air pressure prior to indexing the turret.

8. In a machine for forming and cooking meat in water emulsions, embodying a circular mold-carrying turret having a plurality of molds near its circumference, indexing driving means for rotating the turret in step-by-step fashion through successive stations including a mold stuffing station, a cooking station, a product ejection station and a washing station; the improvement comprising an injection nozzle for feeding emulsion to each mold at the stuffing station, a feed pump, a supply line connecting said pump and said nozzle, an expansible tubular accumulator disposed in said supply line between said pump and said nozzle, a switch actuatable in response to predetermined contraction and to predetermined expansion of said accumulator to respectively start and stop said pump, means for applying fluid pressure to the exterior of said accumulator when each mold is at the stuffing station, and means to cut off the supply of fluid pressure to said accumulator during the indexing of said turret.

9. In a machine for forming and cooking meat in water emulsions, embodying a circular mold-carrying turret having a plurality of molds near its circumference, indexing driving means for rotating the turret in step-by-step fashion through successive stations including a mold stuffing station, a cooking station, a product ejection station and a washing station; the improvement comprising means for feeding emulsion to a mold at the stuffing station, a feed pump, a supply line connecting said pump and said feeding means, an expansible tubular accumulator disposed in said supply line between said pump and said feeding means, means responsive to predetermined contraction and to predetermined expansion of said accumulator to respectively start and stop said pump, means for applying fluid pressure to the exterior of said accumulator when each mold is at the stuffing station, and means to cut off the supply of fluid pressure to the exterior of said accumulator prior to the indexing of said turret.

References Cited in the file of this patent
UNITED STATES PATENTS

| | | |
|---|---|---|
| 994,714 | Boyle | June 13, 1911 |
| 2,725,850 | Makous | Dec. 6, 1955 |
| 2,871,508 | Hill | Feb. 3, 1959 |
| 2,905,449 | Belk et al. | Sept. 22, 1959 |
| 2,953,461 | Prohaska | Sept. 20, 1960 |

FOREIGN PATENTS

| | | |
|---|---|---|
| 1,083,694 | Germany | June 15, 1960 |